No. 607,331. Patented July 12, 1898.
J. BERRY.
CHARCOAL KILN.
(Application filed Sept. 11, 1897.)
(No Model.)
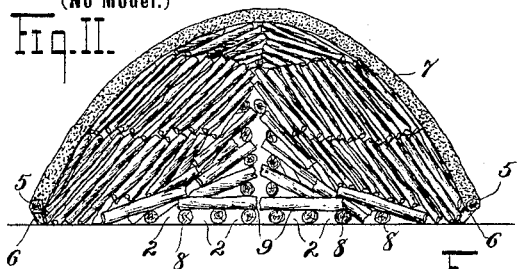
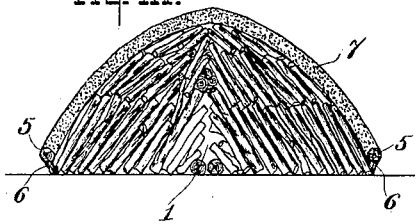
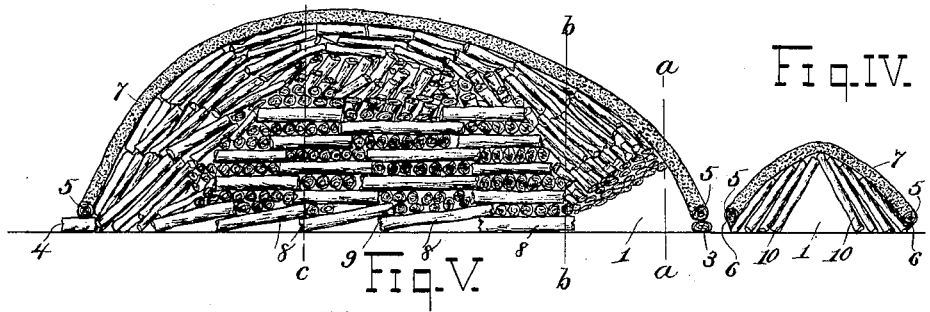
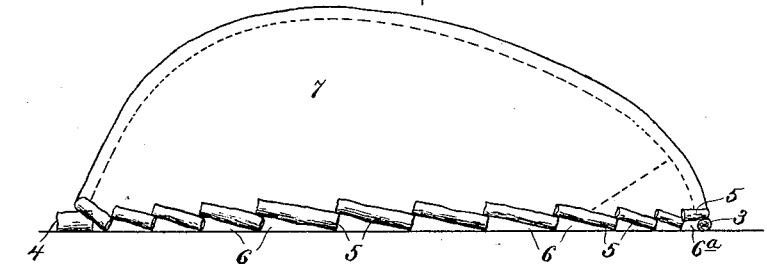
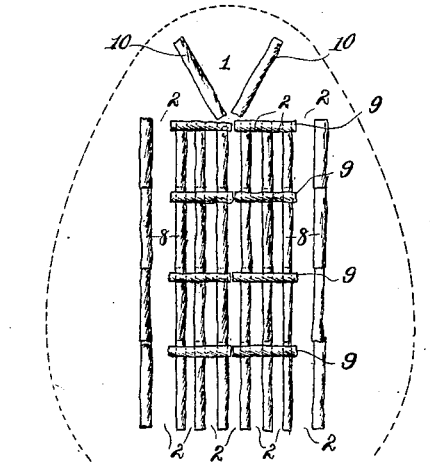
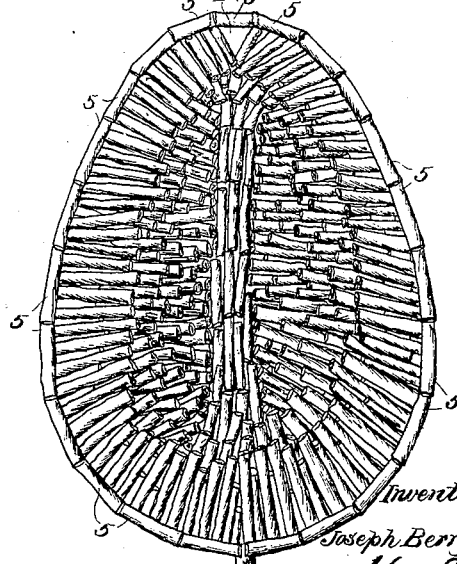
Witnesses
Inventor
Joseph Berry
THE NORRIS PETERS CO., PHOTO-LITHO., WASHINGTON, D. C.

UNITED STATES PATENT OFFICE.

JOSEPH BERRY, OF TACOMA, WASHINGTON.

CHARCOAL-KILN.

SPECIFICATION forming part of Letters Patent No. 607,331, dated July 12, 1898.

Application filed September 11, 1897. Serial No. 651,355. (No model.)

*To all whom it may concern:*

Be it known that I, JOSEPH BERRY, a citizen of the United States, residing at Tacoma, in the county of Pierce and State of Washington, have invented a certain new and useful Improvement in Charcoal-Kilns and Methods of Producing the Same, of which the following is a specification.

My invention relates to new and useful improvements in charcoal-kilns, and has for its objects to increase the facility with which charcoal may be produced from cord-wood and to so construct a kiln as to bring an even and complete draft throughout the entire structure.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 is a longitudinal section of a kiln constructed in accordance with my improvement; Fig. 2, a vertical cross-section on the line $c\ c$ of Fig. 1; Fig. 3, a similar view upon the line $b\ b$ of Fig. 1; Fig. 4, a similar view upon the line $a\ a$ of the same figure. Fig. 5 is a side elevation of a completed kiln "coal-pit," showing the manner of arranging the blocks to bring about the proper ventilation under each of said blocks; Fig. 6, a reduced plan of the foundation of the pit; and Fig. 7, a reduced plan view of the kiln, the earth or top covering being omitted.

In starting the formation of the kiln in accordance with my improvement the foundation is laid, as shown in Fig. 5, by the laying of the cord-wood sticks 8 lengthwise of the pit, one end of each resting upon the end of the next adjacent stick, as shown in Fig. 1, while the opposite end rests upon the ground, and five or more of such layers are so placed, in accordance with the size of the kiln, leaving between each layer an open space, (designated at 2,) which serve as draft-channels throughout the kiln. Cord-wood sticks 9 are now laid crosswise, as shown in Figs. 1 and 6, and this arrangement is continued to any height desired. In front of the pit I form a V-shaped opening or space I by the proper arrangement of the cord-wood, which serves as a fire-pit for starting the kiln.

In placing the outer blocks or sticks around the kiln, as shown in Figs. 5 and 7, I commence in the rear with the block 4 and lay the ends of the sticks 5 next adjacent thereto upon this block and thereafter the end of each of the sticks 5 upon the stick previously laid, while the opposite end thereof rests upon the ground, and this arrangement is continued to the right and left around the kiln, toward the front thereof, which leaves a series of spaces 6 for free ventilation under each stick. When the front portion of the kiln is reached, I lay a block 3, placing the outer ends of the last two sticks 5 upon this block, so as to provide for a draft to the fire-pit by the spaces $6^a$, Fig. 5.

As clearly shown in Fig. 7, I pile all the wood so that it leans toward the front in order that when it is burning toward the rear the coals will drop toward the front, and as this process continues the forward sticks 5 may be removed, thus closing the ventilation at these points, thereby regulating the operation and preventing the overburning of a portion of the wood, while not sufficiently burning other portions thereof, and, as is well understood in this art, this is of great importance.

Should any portion of the charcoal be wanted before the kiln is entirely burned, I can after twenty-four or more hours remove from the kiln by cutting off a portion of the ventilation, as just described, a certain amount of the charcoal—say fifty or more bushels—without any danger to the remaining wood which is unburned, and this is a great advantage over the old method.

Another advantage of my improvement is that the operation carried on in the kiln may be so regulated as to burn the wood therein fast or slow, thus giving the attendant perfect control over the operation with very little care, and still another advantage of my improvement is that it obviates the necessity of dressing, since when the fire is once started in the fire-pit no further attention is required, except to regulate the draft, and even this is not essential when the particular time consumed in the operation is immaterial, since the process will continue on account of the uniformity of draft and the fact that the fire constantly works from the front to the rear portion of the kiln until the entire process is completed.

Heretofore considerable danger has been experienced in the care and manipulation of a kiln occasioned by the breaking in of the kiln; but my method overcomes this difficulty, as no breaking in can occur on account of the wood being piled so as to remain solid and require no attention upon the part of the attendant. By extensive experience it has been found that this arrangement and method are exceedingly advantageous, safe, and quick, at least one-third of the usual time being saved in the operation.

Of course I do not wish to be limited to the exact arrangement of the kiln, since it is obvious that this may be varied to a certain degree without departing from the spirit of my invention, which rests in the broad idea of so arranging a charcoal-kiln as to provide an even and uniform draft from front to rear, whereby the wood as converted into charcoal will be in condition to be removed without interfering with the remainder of the process.

Having thus fully described my invention, what I claim as new and useful is—

1. A charcoal-kiln consisting of a foundation of longitudinally-laid sticks, a V-shaped space formed by the arrangement of sticks at the front portion of the kiln, a series of draft-spaces formed around the edge of the kiln by overlapping the ends thereof, and a superstructure composed of cord-wood built thereon, substantially as shown and described.

2. A charcoal-kiln consisting of a series of longitudinal sticks so laid as to provide lengthwise draft-spaces, cross-sticks laid thereon, a V-shaped space formed in the front end of the kiln by the proper stacking of the wood, a series of draft-spaces formed around the edge of the kiln by the proper overlapping of a series of sticks to the right and left, a block 4 from which these overlapping sticks start, and a block 3 upon which the outer ends of the last of these overlapping sticks rest, substantially as and for the purpose set forth.

3. In the formation of a kiln for burning charcoal the combination of a series of overlapping sticks arranged around the edge of said kiln, a block 4 from which said sticks start, and a block 3 upon which they end, substantially as and for the purpose set forth.

In testimony whereof I have hereunto affixed my signature in the presence of two subscribing witnesses.

JOSEPH BERRY.

Witnesses:
A. A. KNIGHT,
S. S. WILLIAMSON.